United States Patent [19]
Frei

[11] 3,894,836
[45] July 15, 1975

[54] PAPER DYE
[76] Inventor: Alfred Frei, Oberwilerstrasse 89, Binningen, Basel-Land, Switzerland
[22] Filed: July 23, 1971
[21] Appl. No.: 165,579

[30] Foreign Application Priority Data
Aug. 5, 1970 Switzerland............. 11775/70
Apr. 16, 1971 Switzerland............. 5562/71

[52] U.S. Cl.............. 8/7; 8/42 R; 8/79; 8/88; 162/162
[51] Int. Cl............................. D21h 1/46
[58] Field of Search .......... 8/42 R, 79, 88, 91, 7; 260/183; 162/162

[56] References Cited
UNITED STATES PATENTS

| | | | |
|---|---|---|---|
| 2,148,659 | 2/1939 | Straub et al. | 8/42 R |
| 2,749,207 | 6/1956 | Menzi et al. | 8/42 R |
| 2,842,536 | 7/1958 | Bauer et al. | 260/183 |
| 3,537,807 | 12/1970 | Streck | 8/42 R X |

FOREIGN PATENTS OR APPLICATIONS
937,879    8/1948    France

Primary Examiner—Thomas J. Herbert, Jr.
Assistant Examiner—Bruce H. Hess

[57] ABSTRACT
Paper dye of the formula

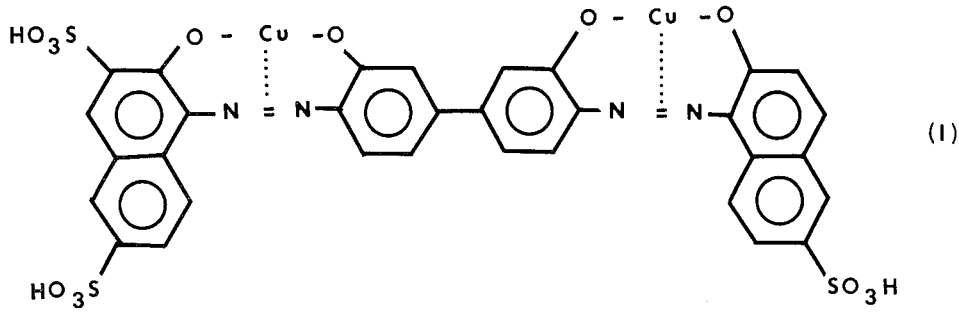

(1)

especially in liquid or granulated form.

12 Claims, No Drawings

PAPER DYE

This invention relates to a process for dyeing paper, which is characterized by the use of the dye of the formula

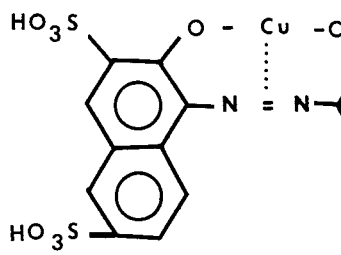 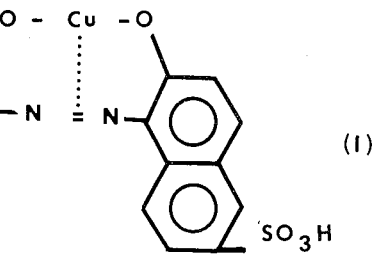 (I)

The dye is employed preferably as one of its salts, for instance an alkali metal (sodium or potassium) salt or an ammonium salt. The said dye is known and is used for dyeing cotton, on which, as is stated in the literature, it requires heating for fixation.

It has been found that the dye of formula (I) is eminently suitable for paper dyeing. It can be used for dyeing unsized and sized (previously or subsequently sized) paper grades by dipping, coating, spraying or other suitable methods, though it is especially valuable for application in the stock prior to sheet formation.

The dye, which is well soluble in water, gives level dyeings of brilliant reddish blue shade on paper which are notable for their fastness; they are very fast to light, fading tone-in-tone after a long period of exposure, and show similarly good wet fastness properties (alcohol, milk and in particular water fastness).

The dye of formula (I) can be converted into liquid dye preparations containing 1 part by weight of dye, 3–11 parts by weight of water and 0.5–3 parts by weight of an amino alcohol, preferably a lower mono-, di- or tri-alkanolamine in which each alkanol radical optimally contains 2 or 3 carbon atoms. Mono-, di- and tri-ethanolamine and mono- and di-iso-propanolamine may be named as examples, of which diethanolamine is especially suitable. These liquid preparations are produced by mixing the stated components, if necessary with heating for a short time; they may contain further additives, such as wetting or dispersing agents.

The new liquid preparations are true solutions or, if concentrated, dispersions (suspensions). They can be employed for dyeing as such or after dilution with water as stock solutions. They are excellent for preparing liquors and pastes for paper dyeing by coating, spraying and dipping methods; however, they are especially well adapted for addition to the stock before conversion into sheet, where they can be metered continuously into the stock stream in the undiluted state.

The dye preparations disclosed herein have the advantage of being easier to handle. The inconvenient dusting that occurs when powder dyes are weighed out is absent. They are storable at room temperature for several months, withstand frost and are immune from mould growth.

The dye of formula (I) can be employed with equal success in the form of granules, preferably of neutral to alkaline reaction, instead of the liquid form. The granulated preparations of the dye are characterized by containing, with the dye, a maximum of 50 percent of a salt (commonly used in dyeing preparations) which dissociates in water and/or a non-hygroscopic dextrin; the average size of the granules is at least 20 microns. Salts of neutral or alkaline reaction which dissociate in water are suitable, but preference is given to the salts of alkali metals, e.g. sodium chloride, potassium chloride, sodium sulphate, potassium sulphate, monosodium and disodium phosphate, sodium and potassium pyrophosphate, sodium and potassium carbonate. Non-hygroscopic dextrins which form no lumps when stirred in aqueous medium are especially suitable, c.f. Ullmann, Enzyklopaedie der technischen Chemie (1965), Vol. XVI, pp. 349–352, particularly pp. 351–352. Dextrins highly soluble in cold water are preferred.

The granulated preparations can be produced with the dye in the form of the moist acid presscake of low salt content (preferably not more than 25 percent of its dry weight of inorganic salts) as obtained in manufacture after acidification. As the granules are best produced by granulation, for example atomization of a neutral or alkaline liquid preparation, if an acid presscake is used, it is best to neutralize it with a strong base, such as lithium, sodium or potassium hydroxide. The granulated dye preparations can be produced by dissolving or suspending the dye, the salt or salts, the dextrin, and (if used) the strong base in two to ten or preferably two and a half to five times the amount of water. If a suspension is formed, it is advantageously homogenized. The solution or suspension is granulated by one of the standard methods, preferably atomization, to give granules averaging at least 20, preferably 40 to 120 microns in size.

The granules are free-flowing and readily soluble in water, so they are excellent for dry addition to paper stocks. They also show good storage stability, especially chemical stability. Compared with the powder dyes used to date they offer the advantages of better wettability and higher solubility in water, this being especially true of preparations containing a maximum of 30 percent of a salt which dissociates in water. This means that stock solutions of concentrated strength can be prepared. Moreover, the granules are easier to handle in weighing out additions for dyeing, and for loading into containers.

In relation to the nearest comparable dye which is of the formula

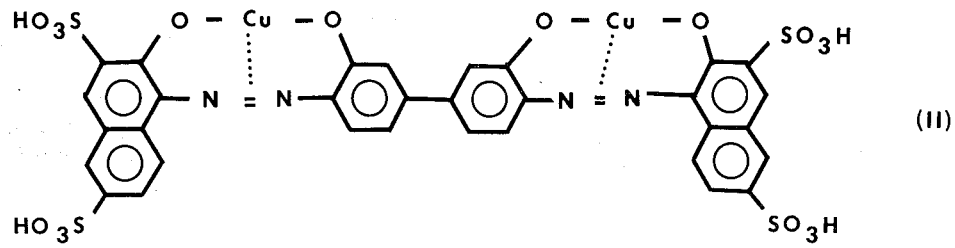 (II)

the dye of the formula (I) is of higher solubility in water and forms much more stable liquid dyeing preparations.

In comparison with the next comparable dye of formula

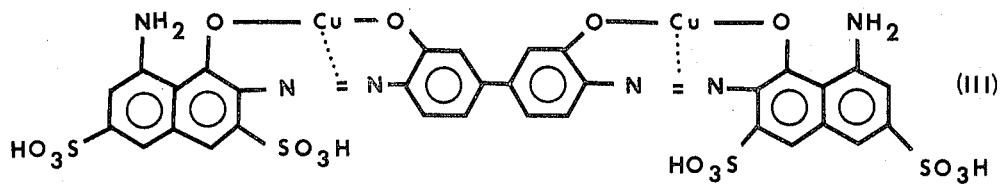

the dye of formula (I) has higher substantivity and on subsequently sized paper gives dyeings of better wet fastness.

In the following Examples the parts and percentages are by weight and the temperatures in degrees centigrade.

EXAMPLE 1

One part of the dye of the formula

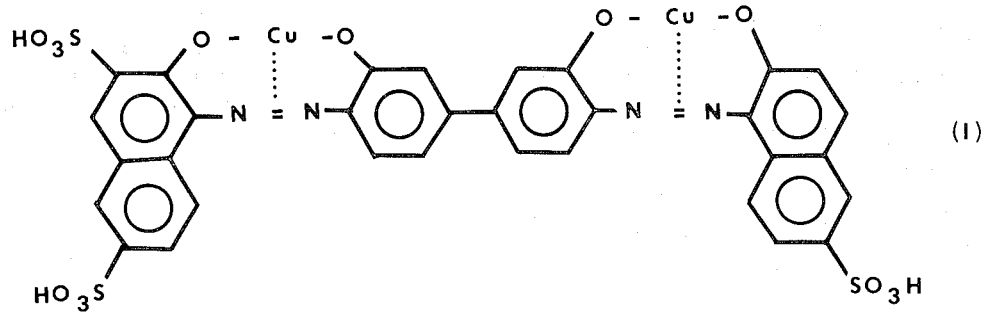

in the form of a moist, mineral acid 25 percent presscake is homogeneously mixed with 8 parts of water, and dissolved by the addition of 0.9 part of diethanolamine, if necessary with heating to 60°. This preparation is storable for several months at room temperature.

EXAMPLE 2

One part of the dye of formula (I) in the form of a moist mineral acid presscake of 25 percent strength is dissolved in 3.2 parts of 70 percent diethanolamine solution, on which a preparation showing comparably good stability is obtained.

EXAMPLE 3

80 Parts of a powder dye containing 82 percent of the dye of formula (I) and salt are homogeneously mixed with 20 parts of a standardizing agent, for example dextrin, and with 300 parts of water in a mixer. The obtained suspension is converted in an atomizer drier into granules averaging 40 μ in size. This dye preparation is highly soluble in water.

APPLICATION EXAMPLE A

100 Parts of chemically bleached sulphite pulp suspended in water are beaten to the desired fineness; 3 parts of the preparation described in Example 2 and, after 15 minutes, the sizing agent (which fixes the dyeing) are added. Paper made from this stock is dyed in a reddish blue shade of medium depth which has good fastness properties. The white water from the paper machine is colourless.

Comparably good dyeings are obtained when 0.7 part of the preparation of Example 3 are used in place of 3 parts of the preparation of Example 2.

EXAMPLE 4

53 Parts of the dye of the formula

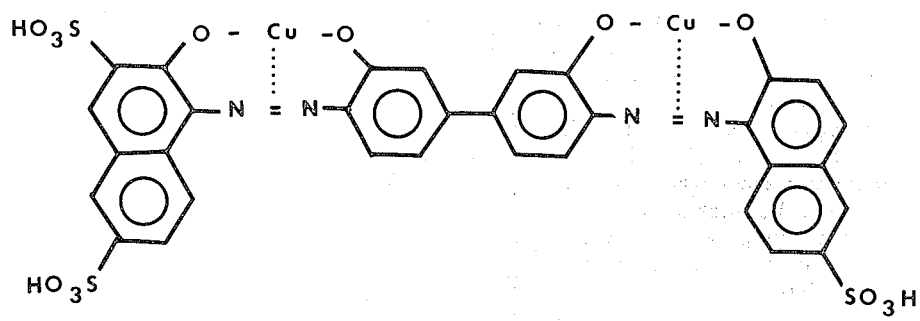

in the form of the moist acid presscake obtained on manufacture, which contains 20 percent dye, 5.5 percent inorganic salts and 74.5 percent water, are added to 300 parts of water, along with 5.5 parts of lithium hydroxide and 20 parts of dextrin. Stirring gives a homogeneous suspension which is converted in an atomizer drier into granules averaging 40 microns in size. These are readily soluble in water and very suitable for paper dyeing.

APPLICATION EXAMPLE B

100 Parts of chemically bleached sulphite pulp in aqueous suspension are beaten to the required fineness, 0.5 part of the granulated dye preparation of Example 4 are added, followed after 15 minutes by the sizing agent, which fixes the dye. The paper made with this

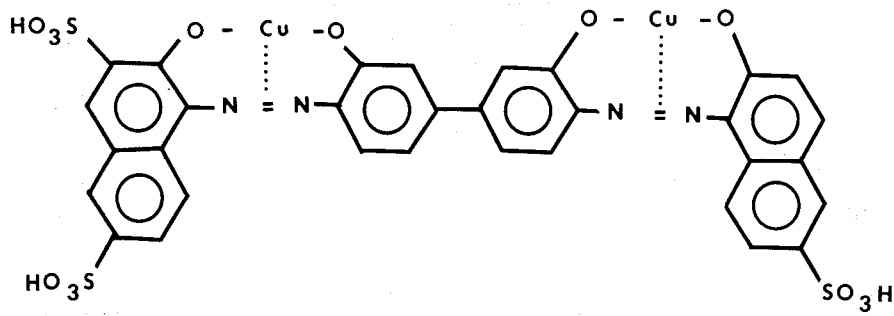

stock has a reddish blue shade of medium depth showing good fastness properties. The white water is colourless.

Having thus disclosed the invention what I claim is:

1. A process for producing colored paper comprising (a) incorporating into paper stock an effective amount of a dye and forming paper from said paper stock or (b) treating paper sheet with an effective amount of a dye, said dye being the compound of the formula

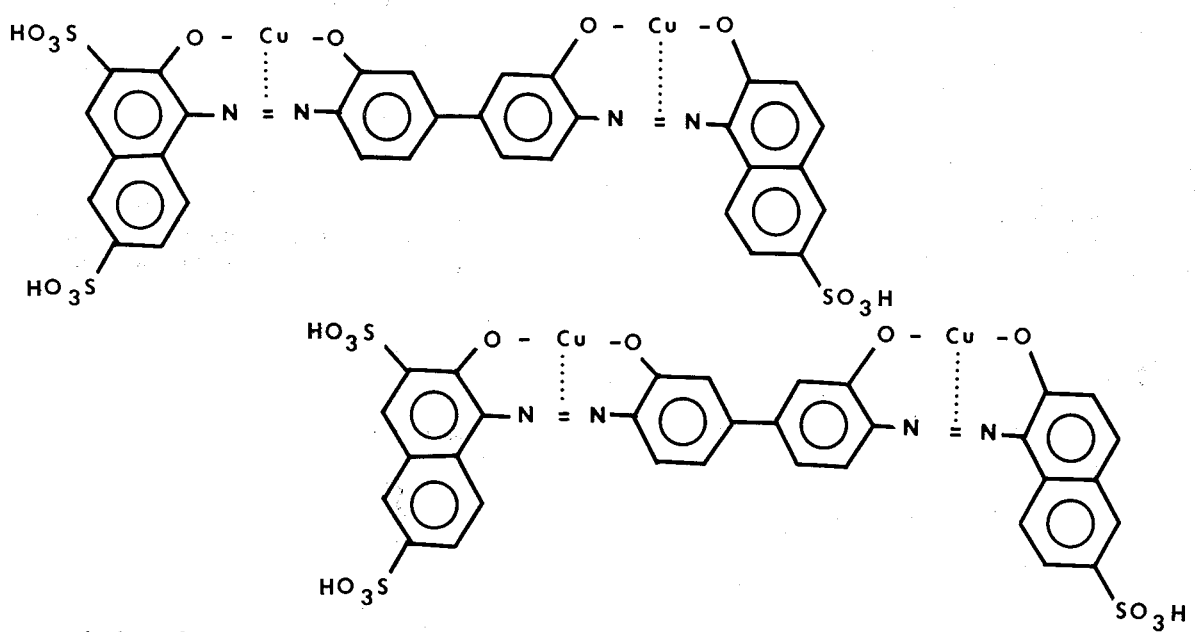

or a salt thereof, and said effective amount being an amount sufficient to impart the desired color to the paper.

2. A process according to claim 1 comprising treating paper sheet with an effective amount of the compound of the formula

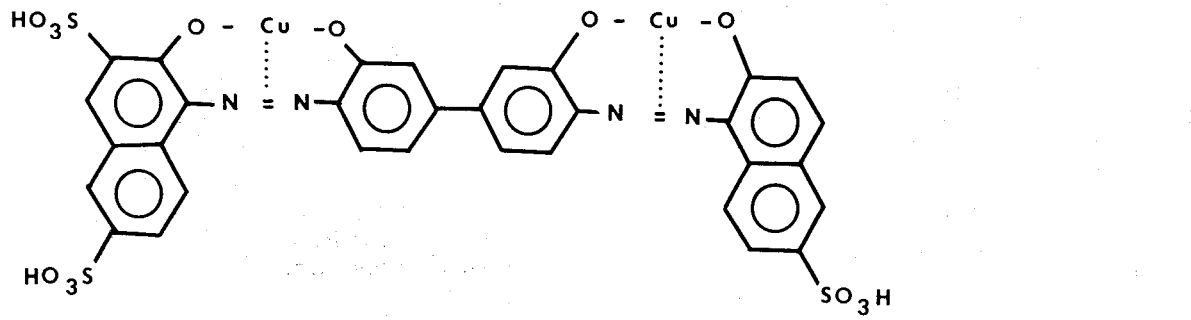

or a salt thereof, said effective amount being an amount sufficient to impart the desired color to the paper sheet.

3. A process according to claim 2 comprising applying to paper sheet an effective amount of an aqueous solution of the compound of the formula

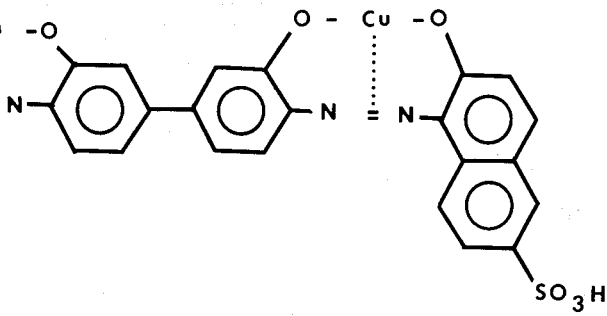

or a salt thereof, said effective amount being an amount sufficient to impart the desired color to the paper sheet.

4. A process according to claim 1 comprising incorporating into paper stock an effective amount of the compound of the formula or a salt thereof, said effective amount being an amount sufficient to impart the desired color to the paper sheet to be formed, and forming paper sheet from said paper stock.

5. A process according to claim 4 comprising incorporating into paper stock an effective amount of an aqueous solution of the compound of the formula

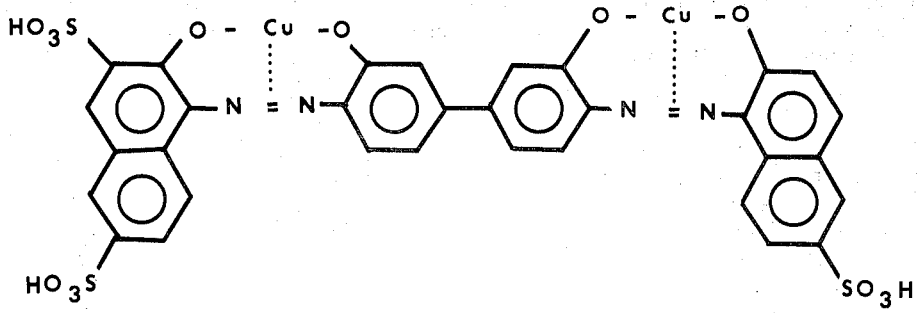

or a salt thereof, said effective amount being an amount sufficient to impart the desired color to the paper sheet to be formed, and forming paper sheet from said paper stock.

6. A process according to claim 5 wherein said aqueous solution comprises 1 part by weight of the compound of the formula

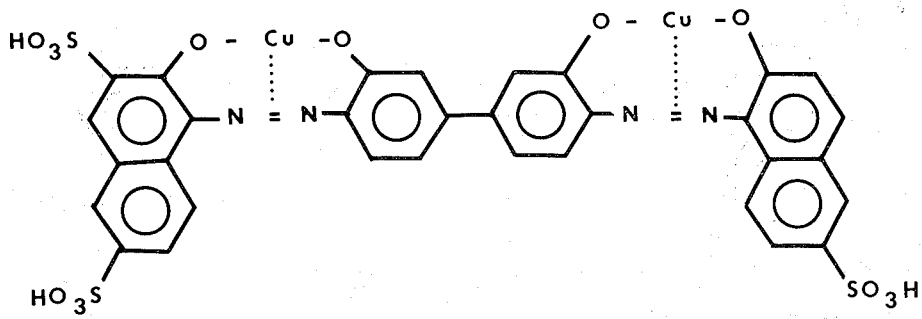

or a salt thereof, 3 to 11 parts by weight of water and 0.5 to 3 parts by weight of an amino alcohol.

7. A process according to claim 6 wherein said amino alcohol is a compound of the formula

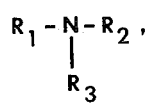

wherein
each of $R_1$, $R_2$ and $R_3$ is independently hydrogen or lower hydroxyalkyl,
with the proviso that at least one of $R_1$, $R_2$ and $R_3$ is lower hydroxyalkyl.

8. A process according to claim 4 comprising incorporating into paper stock an effective amount of a granular composition comprising the compound of the formula

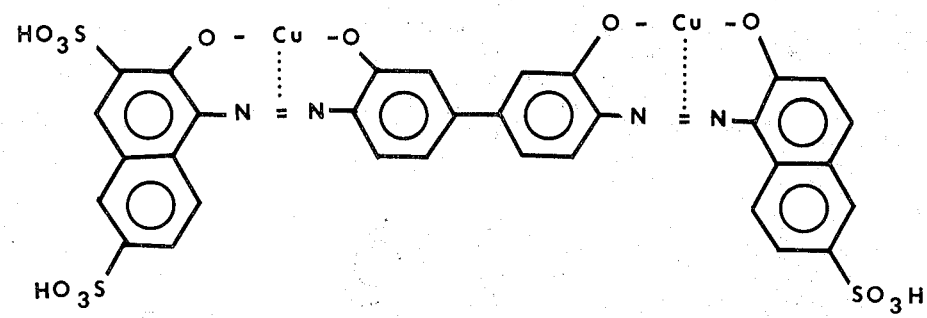

or a salt thereof, up to 50 percent of non-hygroscopic dextrin or at least one salt that dissociates in water, or a mixture thereof, with the proviso that the average size of the granules is at least 20 microns, said effective amount being an amount sufficient to impart the desired color to the paper sheet to be formed, and forming paper sheet from said paper stock.

9. A process according to claim 8 wherein said salt that dissociates in water is sodium chloride, potassium chloride, sodium sulfate, potassium sulfate, monosodium phosphate, disodium phosphate, sodium pyrophosphate, potassium pyrophosphate, sodium carbonate or potassium carbonate and the average size of the granules is 40 to 120 microns.

10. A process according to claim 4 comprising admixing an effective amount of the compound of the formula

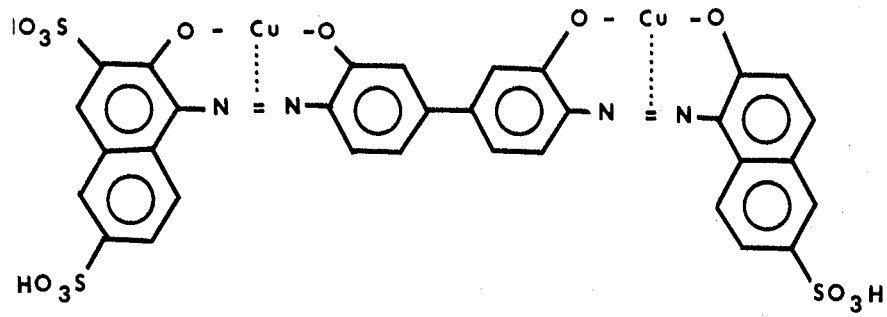
or a salt thereof, with cellulose in an aqueous medium to form paper stock, said effective amount being an amount sufficient to impart the desired color to the paper sheet to be formed, and forming paper sheet from said paper stock.
11. Paper produced by the process of claim 1.
12. Paper produced by the process of claim 4.
* * * * *